United States Patent [19]

Hazelden

[11] Patent Number: 5,369,583
[45] Date of Patent: Nov. 29, 1994

[54] OPTICAL TORQUE SENSORS AND STEERING SYSTEMS FOR VEHICLES INCORPORATING THEM

[75] Inventor: Roger J. Hazelden, Worcestershire, England

[73] Assignee: Lucas Industries public limited company, Solihull, England

[21] Appl. No.: 12,997

[22] Filed: Feb. 3, 1993

[30] Foreign Application Priority Data

Feb. 12, 1992 [GB] United Kingdom ............... 9202868

[51] Int. Cl.⁵ .................... G06F 15/50; G01L 3/02
[52] U.S. Cl. .................... 364/424.05; 364/481
[58] Field of Search .............. 364/424.05, 481, 424.01; 73/862.08, 862.21, 862.23, 862.34, 862.326, 862.334; 250/231.13, 231.17

[56] References Cited

U.S. PATENT DOCUMENTS

| | | | |
|---|---|---|---|
| 4,433,585 | 2/1984 | Levine | 73/862.34 |
| 4,561,515 | 12/1985 | Hashimoto et al. | 180/79.1 |
| 4,621,833 | 11/1986 | Soltis | 280/707 |
| 4,693,123 | 9/1987 | Bacardit | 73/862.33 |
| 4,798,253 | 1/1989 | Naito | 180/79.1 |
| 4,882,693 | 11/1989 | Yopp | 364/424.01 |
| 5,065,324 | 11/1991 | Oshita et al. | 364/424.05 |
| 5,182,953 | 2/1993 | Ellinger et al. | 73/862.335 |

FOREIGN PATENT DOCUMENTS

| | | |
|---|---|---|
| 0065786A | 12/1982 | European Pat. Off. |
| 0340172A | 11/1989 | European Pat. Off. |
| 2118722 | 11/1972 | Germany |
| 417051 | 9/1934 | United Kingdom |

Primary Examiner—Thomas G. Black
Assistant Examiner—Tan Q. Nguyen
Attorney, Agent, or Firm—Christensen, O'Connor, Johnson & Kindness

[57] ABSTRACT

A torque sensor, or a relative angular movement sensor, comprises an LED light source mounted in a fixed position relative to a housing which shines light through an associated fixed collimator plate, the light being detected by a pair of detectors also mounted fixed relative to the housing. Two masks pass between the source and the detector, one of the masks being fixed to an input shaft of the steering system and the other being connected to the output shaft. Each of the masks has a first and second aperture, and the amount of light which is received by detectors depends upon the degree of overlap between associated pairs of apertures in the input and output masks. Signals from each of the detectors is fed to a control microprocessor which provides a signal indicative of differential torque between the input and output shafts. This signal is substantially independent of the intensity of the light source which allows it to compensate for ageing effects in the light source. The signal also shows a positive value for turning of the input shaft in one direction and a negative value for turning the input shaft in the opposite direction. The torque sensor can be used to obtain the torque, relative change of steering angle, and steering angle itself, which can all be passed to a vehicle ride or braking control system.

16 Claims, 7 Drawing Sheets

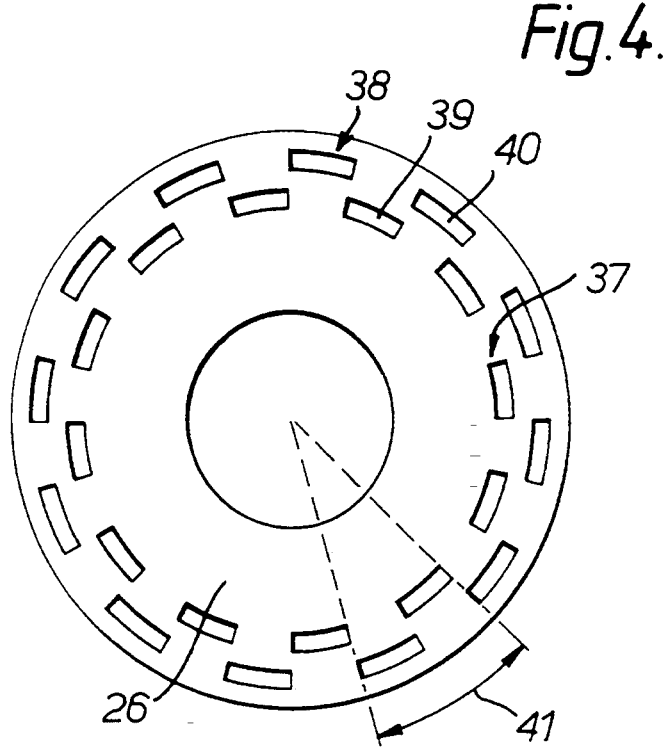
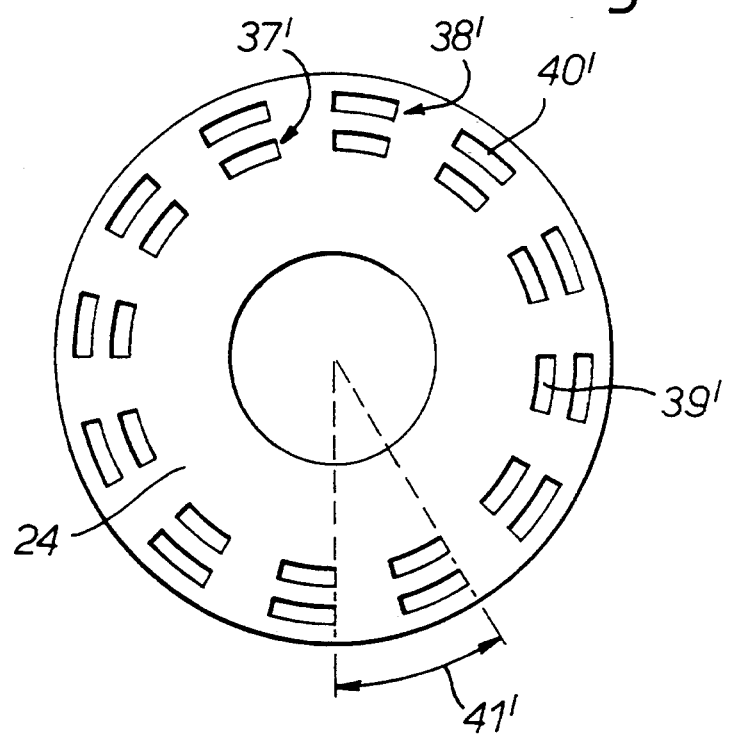

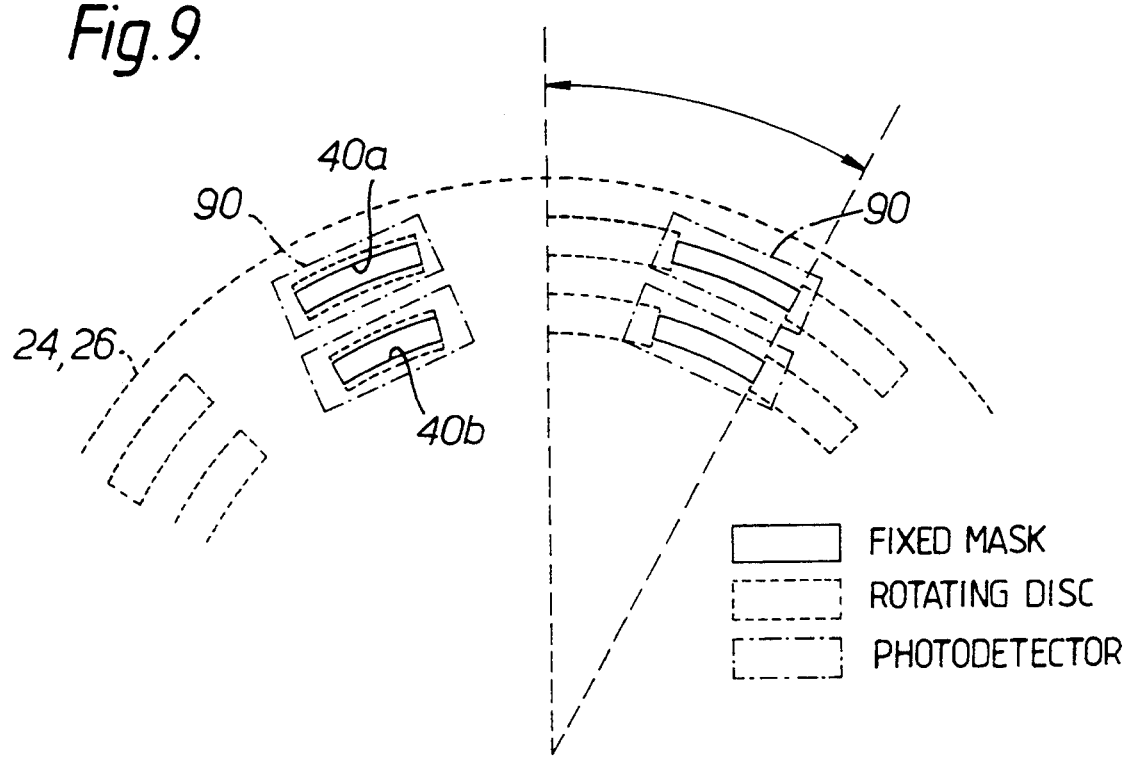
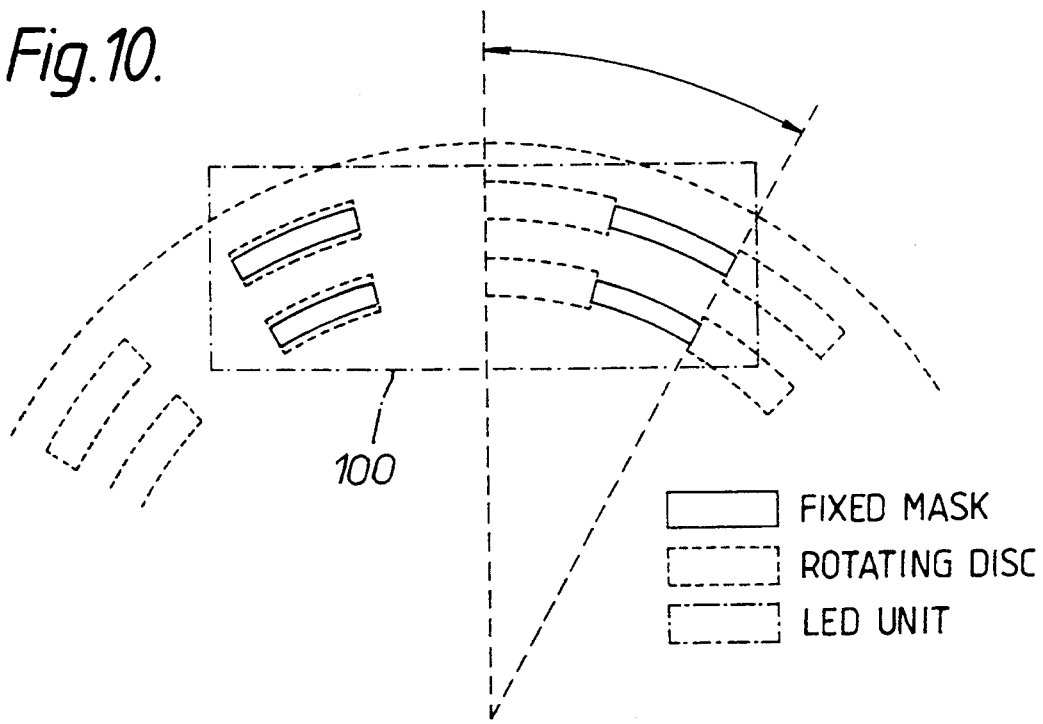

OPTICAL TORQUE SENSORS AND STEERING SYSTEMS FOR VEHICLES INCORPORATING THEM

BACKGROUND OF THE INVENTION

This invention relates to optical torque sensors especially, but not exclusively, for incorporation in power-assisted steering systems for vehicles.

It is known to use electromagnetic torque sensors in power-assisted steering systems for vehicles which monitor magnetic flux or electric current, or other electromagnetic phenomena, but they are prone to interference form electrical and radio sources and need shielding to prevent spurious pulses in the control system. Electromagnetic shielding is difficult, heavy, and expensive. It has also been proposed to use emitters and sensors of electromagnetic radiation to detect torque in a torque sensor, however these can be difficult to calibrate and suffer from problems associated with changes over time in the output of the emitter and/or the sensitivity of the sensor.

An aim of the present invention is to provide a new relative angular displacement, or torque, sensor and/or a new power steering system.

SUMMARY OF THE INVENTION

According to a first aspect the invention comprises a torque sensor comprising an input member; an output member; emitter means; first receiver means for receiving a first signal, the first receiver means comprising means to output a first output signal dependent upon the first signal, second receiver means for receiving a second signal, the second receiver means comprising means to output a second output signal dependent upon the second signal, and signal processing means, for dividing the difference between the first and second output signals by the sum of the first and second output signals, the output signals of the receiver means being dependent upon the first and second signals which they receive, and the signal processing means being adapted to process the output signals from the first and second receiver means so as to produce a modified output signal which is directly proportional to relative angular displacement between, or torque applied between, the input and output members.

Preferably signal varying means is provided interposed between the emitter means and at least one of the receiver means. The signal varying means may be angularly moveable with a one of the input or output members.

The emitter means may comprise a first effective emitter and a second effective emitter.

Preferably the first and second receiver means comprise first and second effective receivers respectively.

Preferably the first effective emitter is associated with one of the input or output members, a first effective receiver is associated with the other of the input or output members, a second effective emitter is associated with a first of said input or output members, and a second effective receiver is associated with a second of said input or output members.

Preferably said one of said input and output members is said first of said input and output member.

The effective receivers may each be adapted to produce an output signal indicative of the signal which it itself receives from its respective complementary effective emitter.

The first and second effective emitters may comprise the same effective emitter.

The processing means preferably adds the first and second signals. The processing means may determine the difference between the first and second signals. Most preferably the processing means divides the difference between the first and second signals by the sum of them so as to produce said output signal.

The effective emitter(s) may comprise an emitter, or an emitter and associated emitter collimator. Similarly, the effective receivers may each comprise a receiver, or a receiver and associated receiver collimator. Whilst the effective emitters and receivers are associated with the input or output member, they do not in the preferred embodiments move with them.

There may be a set of first and/or second effective emitters and/or receivers. As previously mentioned, the first and second effective emitters may comprise the same emitter (or emitter plus collimator or collimators). When there is a single emitter the signal processing means preferably produces an output signal which is substantially independent of the strength of the emitter. This enables the strength of the emitter to vary over time without affecting the calibration of the torque sensor.

The sum of the first and second emitter signals is preferably substantially constant, irrespective of the torque applied. A substantial deviation of this sum from a predetermined value may indicate the existence of a problem, and the processor means may look for this periodically (for example it may include a reference value for the sum and a comparator).

Input and output masks may be associated with the input and output members respectively. When provided the input and output masks are interposed between the first and second effective emitters and the first and second effective detectors.

The input and/or output masts may have first and second apertures corresponding to said first and second effective emitters and/or effective receivers. The first and second effective emitters and/or receivers may be at inner and outer radial positions relative to an axis of angular movement about which at least one of the input or output members moves angularly. Preferably both the input and output members are angularly movable about said axis, said input and output masks moving angularly with the input and output members respectively.

Preferably the input and/or output mask comprises an angularly spaced set of apertures. The input and/or output masks preferably comprises an outer aperture and a radially inner aperture. The or each mask may comprise an outer arc of angularly spaced apertures and a radially spaced inner arc of angularly spaced apertures. The inner and/or outer arcs of apertures may extend around a complete circle. The apertures preferably have an angular extent which is about half of their pitch (that is to say that the distance between adjacent apertures is about the same as the width of an aperture).

The input and output masks preferably have apertures which are capable of being at least partially overlapped or superimposed when viewed superimposed along the line of sight between a complementary emitter and receiver.

The apertures are preferably at least partially superimposed when no torque is applied to the input member.

The apertures are preferably partially overlapped, or superimposed, in such a manner that when the input and output member move angularly relative to each other in one sense the overlap increases allowing more light through, but when they move relative to each other in the opposite angular sense the degree of overlap decreases, reducing the amount of light let through. This allows us to identify in which direction the input member is being turned.

Corresponding apertures of the input and output masks are preferably superimposed by about half of their circumferential angular length, and subtend preferably the same angle at the axis of angular movement.

The sensor preferably includes an emitter or receiver mask having inner and outer rings (or pair of rings) of apertures, the apertures of the inner ring being offset form those of the outer ring. Preferably the apertures of the outer ring have an angular extent of about half a pitch, and the apertures of the inner ring may extend angularly for substantially the distance between adjacent apertures of the outer ring. The other of the input or output mask preferably has inner and outer rings (or pair of rings) of apertures, which may be at substantially the same angular position, and may extend circumferentially for substantially half a pitch. Alternatively, the input and output masks may have similar patterns of apertures.

The torque sensor preferably includes a torsion member connecting the input and output member, the torsion member controlling the stiffness of the join between the input and output members.

According to a second aspect the invention comprises a power-assisted steering system having a torque sensor according to the first aspect of the invention, an input column transmitting torque from a steering wheel to the input member of the torque sensor, and an output column transferring torque to a steering mechanism adapted to steer road wheels of the system.

Preferably the output signal of the processing means is used to control the operation of an electric steering motor adapted to steer the road wheels.

According to a third aspect the invention comprises a vehicle incorporating a power-assisted steering system according to the second aspect of the invention in which information from the torque sensor is used to determine at least one of (a) the torque applied to the input member; (b) the rate of turning of the vehicle's steering wheel; or (c) the angular displacement of the vehicle's steering wheel.

Preferably the information (a); and/or (b); and/or (c) is used in a vehicle control microprocessor to modify or control the suspension and/or braking characteristics of the vehicle.

Thus a single torque sensor can provide information for the power steering, active suspension, and brake control, systems of a vehicle.

DETAILED DESCRIPTION OF THE DRAWINGS

Embodiments of the invention will now be described by way of example only with reference to the accompanying drawings of which:

FIGS. 4 and 5 show, respectively, input and output discs which comprise parts of the torque sensor of FIG. 3, FIGS. 6A to 6C show the overlap between apertures in the discs of FIGS. 4 and 5 at different relative angular positions of the discs;

FIGS. 9 and 10 show modifications of a detail the system; and

DESCRIPTION OF THE PREFERRED EMBODIMENTS

Figure 1:
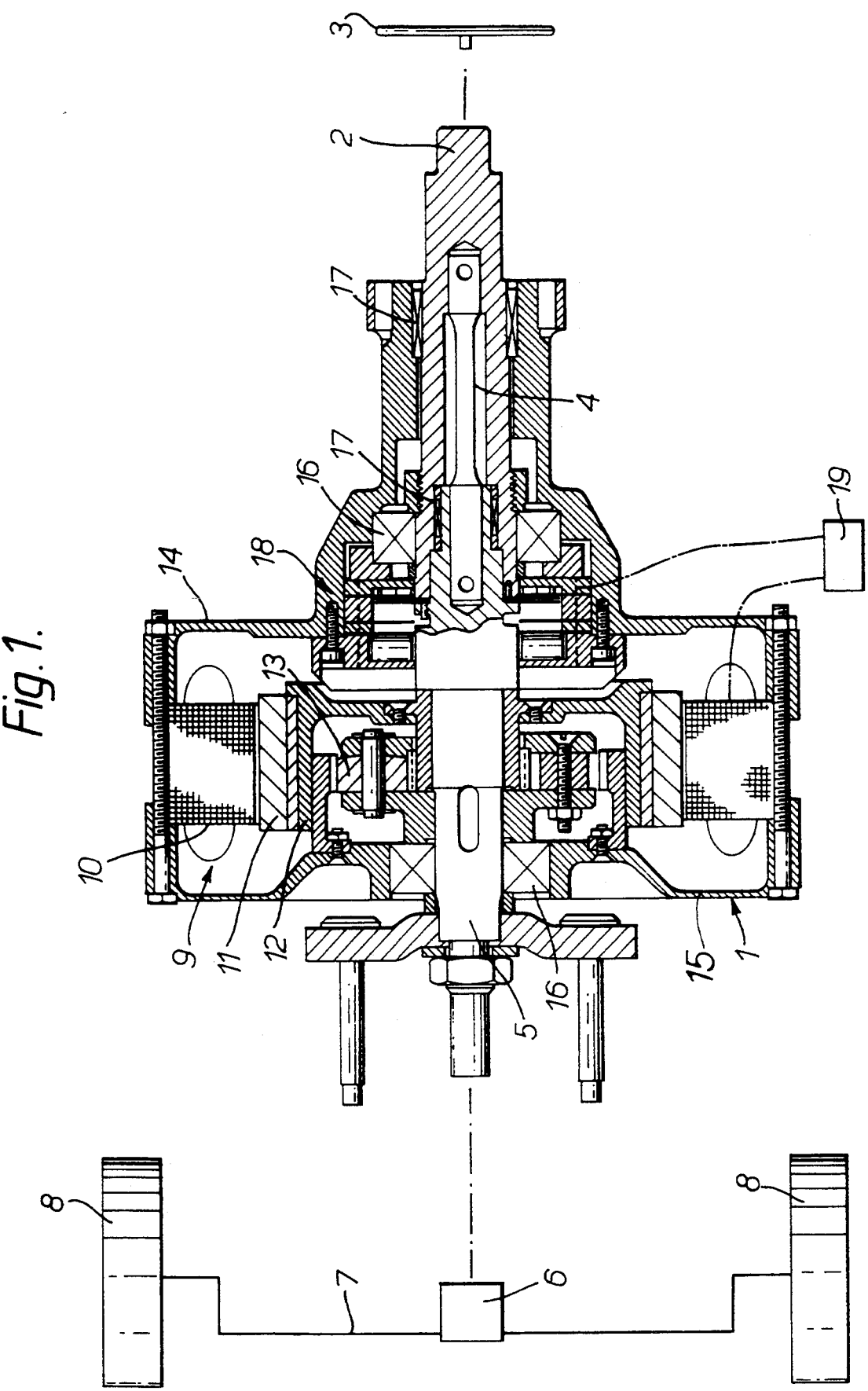
FIG. 1 is a schematic view of a power-assisted steering system for a vehicle.
Figure 2:
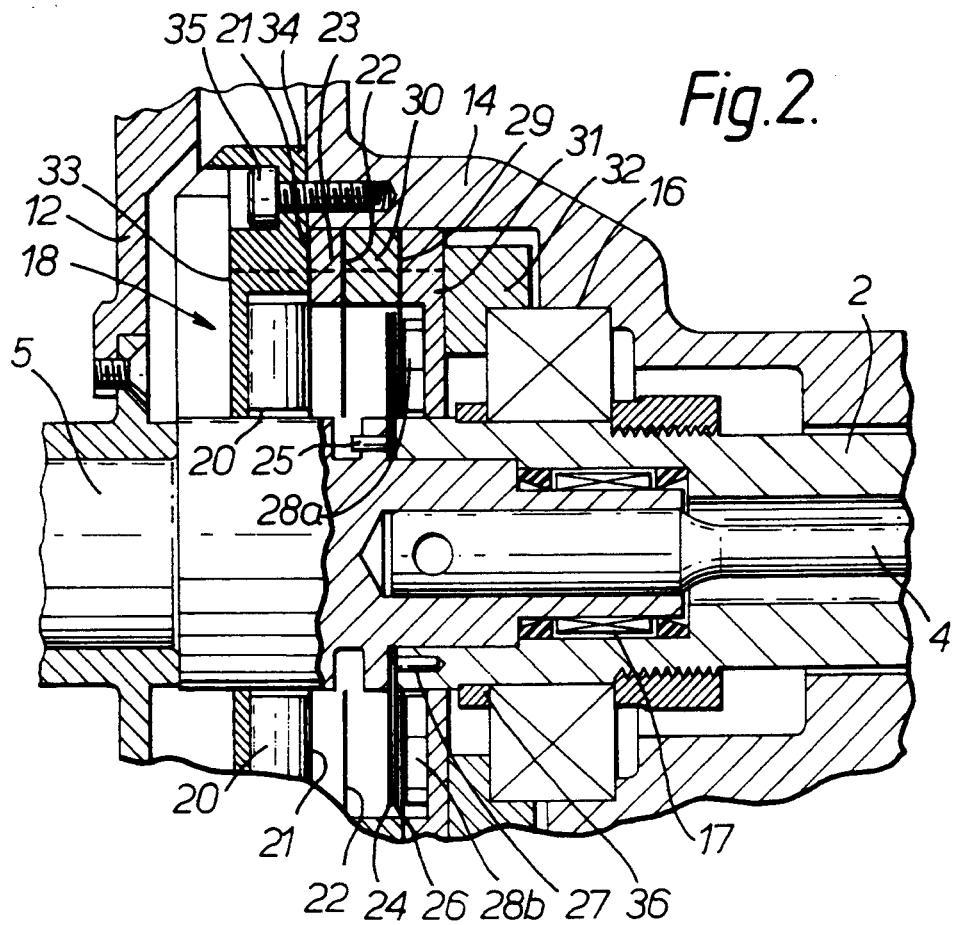
FIG. 2 shows detail of FIG. 1.

A power-assisted steering system 1 for a vehicle is shown in FIG. 1 and comprises a steering input shaft 2 coupled at one end to a steering wheel 3 and at the other end to a quill or torsion bar 4 which transmits steering torque to a steering output shaft 5. The steering output shaft 5 is coupled to a steering transmission 6 which turns a steering rack 7 connected to a pair of the vehicle's road wheels 8. An electric motor 9, comprising a stator 10 and a rotor 11, is coupled to drive the output shaft 5 via gears 12 and 13. Gear housings 14 and 15 surround the motor 9 and the gears 12 and 13, and bearings 16 are provided between the gear housings and the shafts 2 and 5. The input shaft 4 is coupled to the output shaft 5 only via the torsion bar 4 which is removably connected at each end to one of the shafts via pins or screws. Needle bearings 17 are provided between the shaft and a stem of the housing 14, and between the shafts 2 and 5. The needle bearings 17 abut shoulders on the shafts 2 and 5. A differential torque, or relative angular displacement, sensor 18 is provided to detect relative angular displacement between the input shaft 2 and the output shaft 5. Signals from the torque sensor are fed to a control microprocessor 19 which controls the motor 9.

Failure safety transmission means is provided operating only upon failure of the electric motor or control system. The torsion bar is permitted only a limited range of twisting, for example by being constrained to twist within a range defined by torque-transmitting stops. Alternatively or additionally there may be additional torque-transmitting means which becomes operational only upon a failure of the power-assisted system.

The structure and operation of the torque sensor 18 will be described in detail later, but before that there follows a brief discussion of the general operation of the power-assisted steering system.

Input torque is applied to the input shaft 2 which moves angularly relative to output shaft 5, due to the torsion bar twisting under the applied torque differential. The torque sensor 18 detects the relative angular movement between the input and output shafts and sends a signal indicative of the relative displacement to the control microprocessor 19. The microprocessor controls the motor 9 so as to apply torque to the output shaft 5 in a sense such as to reduce the relative angular displacement between the input and output shafts.

Details of the differential torque or relative angular displacement sensor 18 are shown in FIGS. 2 to 5. The torque sensor comprises two LED light sources 20 fixed relative to the housing 14; a pair of source collimator plates 21 and 22 associated with the light sources and also fixed relative to the housing 14; an annular spacer 23 provided between the source collimator plates 21 and 22; an output disc or mask 24 rigidly attached to the output shaft 5 by studs 25; an input disc or mask 26 rigidly attached to the input shaft 2 by studs 27, a pair of light detector units 28a and 28b fixed relative to the housing 14; a detector collimator 29 associated with the detectors units 28 and also fixed relative to the housing 14; an annular spacer 30 interposed between the detector collimator 29 and the source collimator 22; a detector-mounting dish member 31 upon which the detector units 28 are mounted; a packing member 32 provided between the mounting member 31 and the adjacent bearing 16; and an LED - mounting dish member 33 upon which the LED sources are mounted, the dish member 33 having lugs 34 by means of which it is clamped via screws 35 to the housing 14. A circlip 36 holds the bearing 16 in place.

FIG. 4 shows the arrangement of the input mask 26. The mask 26 is an annular disc having inner and outer rings 37 and 38 of circumferentially elongate apertures 39 and 40. The apertures 39 and 40 are equal-angularly spaced and have an angular pitch referenced 41. Each aperture subtends half a pitch at the central axis of the disc. The two rings 37 and 38 are angularly offset in antiphase with each other so that the apertures 39 of the inner ring are at the same angular positions as the opaque, blocking, regions of the outer ring.

FIG. 5 shows the arrangement of the output mask 24 which is similar to that of the input mask 26 (and similar structures have been given similar reference numerals) except that the apertures of the inner and outer rings are not offset, they are in phase with each other. The rings 38 and 38', and 39 and 39' are superimposed upon each other, as illustrated schematically in FIG. 3.

Figure 7:
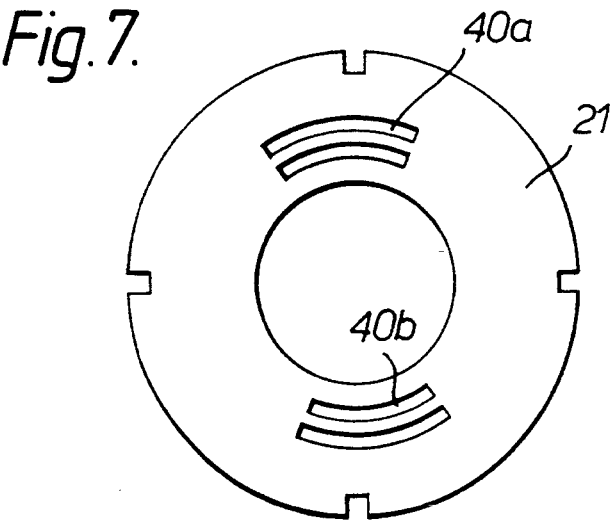
FIG. 7 shows a collimator.

FIG. 7 shows the LED light source collimator 21 which comprises a plate having an angularly spaced pair of inner and outer collimating apertures 40a and 40b each pair of which registers with respective ones of the LED's 20. The collimator plate has notches 41 in its outer periphery which assist in locating the collimator relative to the member 33.

Figure 3:
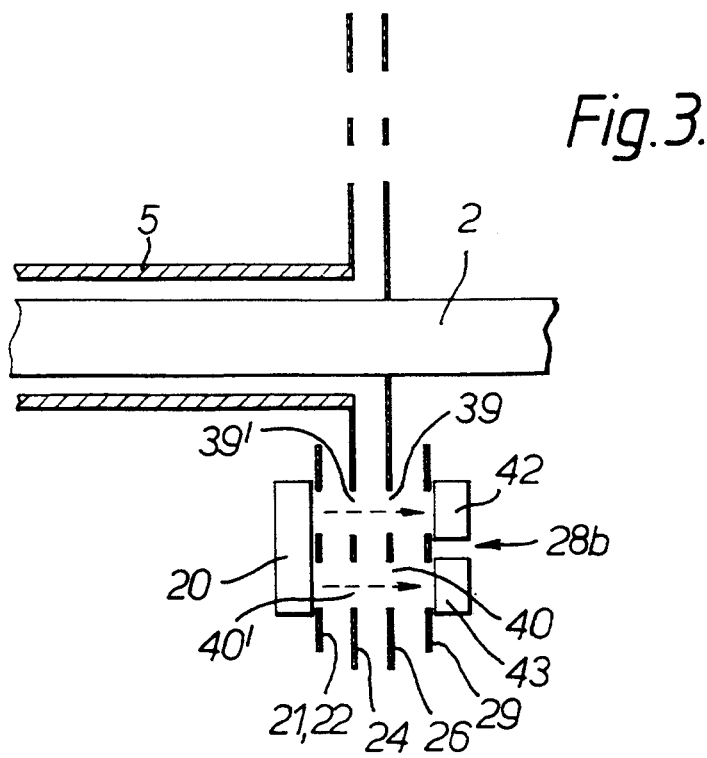
FIG. 3 shows schematically the principle behind an optical torque sensor incorporated in the system of FIG. 1.

Each detector unit 28a and 28b comprises an inner detector 42 and an outer detector 43 (schematically shown in FIG. 3).

Figure 6A:
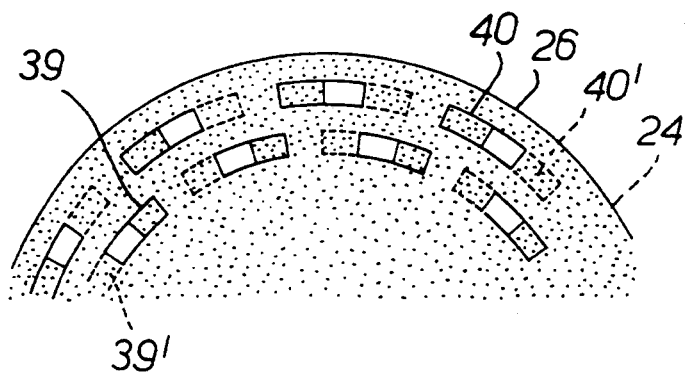
Figure 6B:
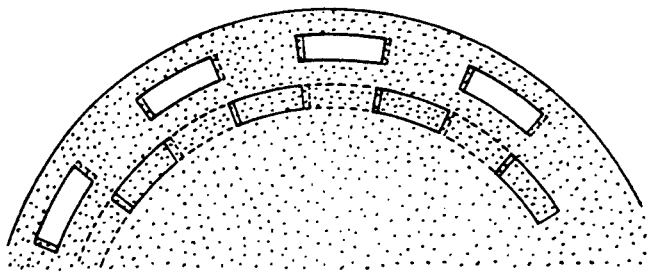
Figure 6C:
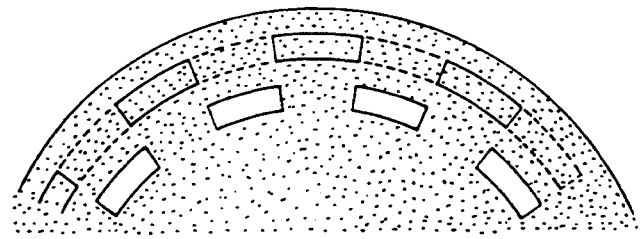

The detector collimator 29 is substantially the same as the source collimator, and the apertures 40a and 40b of each of the collimating plates are aligned. The outer aperture 40a of each pair of apertures registers with an outer detector 43, and the inner aperture 40b with an inner detector 42. FIGS. 3 and 6A to 6C illustrate the principle of the torque detector. FIGS. 6A to 6C show the masks 24 and 26 at different relative angular displacements as seen looking towards the LED's 20 (i.e. with mask 26 in front).

When no torque is applied to the input member 2 the input and output masks have the relative configuration shown in FIG. 6A, with the apertures 40 and 40' overlapped, or superimposed, by about half of their angular extent. The detectors units 28 receive a certain amount of light and produce an appropriate signal corresponding thereto. If torque is applied to the input member 2 it moves it angularly relative to the output member 5, and therefore moves the input and output masks 26 and 24 relative to each other, affecting the degree of overlap of the slots 40 and 40' of the outer rings 38 and 38' and of the slots 39 and 39' of the inner rings 37 and 37'. Thus the amount of light receive by the detectors 28 changes, as does the signal they produce.

FIG. 6B illustrates the situation where the input mask turns clockwise relative to the input mask. There is an increased overlap of the mask apertures of the outer rings, and a decreased overlap of the apertures of the inner rings. Thus the detector 28a which is registered with the outer apertures 40 and 40' (and with the outer collimator apertures 40a) receives more light and gives a higher signal. The detector 28b which is registered with the inner apertures 39 and 39' receives less light and gives a lower signal.

FIG. 6C illustrates the situation where the input mask turns anticlockwise relative to the output mask and the overlap of the outer apertures 40 and 40' decreases whilst that of the inner apertures 39 and 39' increases. Again, the sensors 28a and 28b receive a changed amount of light from the situation of FIG. 6A, but this time in the opposite sense from that experienced in FIG. 6B.

The detectors 28a and 28b are arranged to give an equal signal when there is no torque differential applied between the input and output members.

The signals from the two detectors 28a and 28b are fed to the control microprocessor 19 which operates on a selected one of them to produce a modified output signal indicative of the torque applied. The modified output signal has the form:

$$\text{Modified Torque Signal} = K \times \frac{S_o - S_I}{S_o + S_I}$$

where $S_o$ is the signal from the outer detector and $S_I$ is the signal from the inner detector.

This gives a value of $+K$ for a full scale clockwise rotation (outer signal at maximum and inner signal at zero), and a value of $-K$ for a full scale anticlockwise rotation (outer signal at zero, inner signal at maximum), and a value of K of zero when the applied torque is zero (outer signal equals inner signal).

It will be noted that a pair of detector units 28 are provided. This is to provide a degree of redundancy, the control microprocessor operating on signals from only one detector unit at any one time (although it looks at all of the detector units to check if they are operating properly and selects one which is operating properly to process its signals).

The operating function of dividing the difference between the signals from the two detectors 42 and 43 by their sum achieves the result that the modified signal is independent of the strength of the light source (so long as the same strength light source provides light to each of the detectors, which can best be achieved by using a common light source for any one pair of detectors 42 and 43). This achieves automatic compensation for changes in intensity in the light emitted by the LED's as they age and makes calibration easier.

A further advantage is that the denominator of the function:

$$\text{Modified Torque Signal} = K \times \frac{S_o - S_I}{S_o + S_I}$$

should remain constant regardless of the torque applied (for a constant light source intensity). If the denominator is found to vary significantly, this would can be taken by the microprocessor to indicate a fault in the sensor. In a safety critical system such as vehicle steering, it is highly advantageous to be able to detect failure of the sensor so that appropriate remedial action can be taken. For example, the microprocessor can decide to ignore that sensor and rely upon signals from another instead.

In the embodiment of FIG. 1 the light sources 20 have emitting areas which are larger than the holes 40a and 40b in the source collimators 21 and 22, and the detectors 42 and 43 have detecting areas which are larger than the holes 40a and 40b in the detector assembly collimator 29.

The collimator apertures 40a and 40b are arranged to have radial dimensions similar to those of the apertures 39, 39', 40, 40' in the rotating masks 24, 26 but the circumferential dimension of the collimator apertures is an integral multiple of the aperture pitch on the rotating masks 24, 26. Provided that this relationship is maintained, the output from each detector will be independent of the shaft rotation and will depend only on the torque. As one aperture in the rotating masks moves out of the filed of view of a detector 42,43 another aperture moves into its field of view, thus keeping the detector output constant.

Figure 8A:
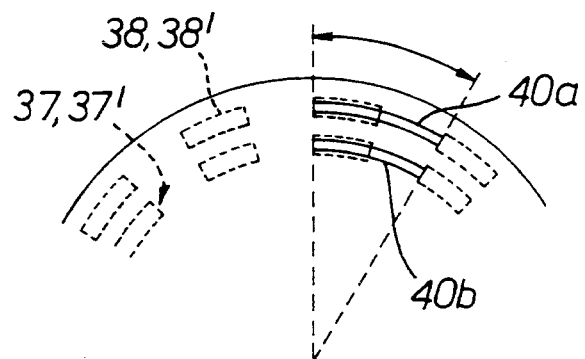
FIGS. 8A and 8B show alternative features of detail.
Figure 8B:
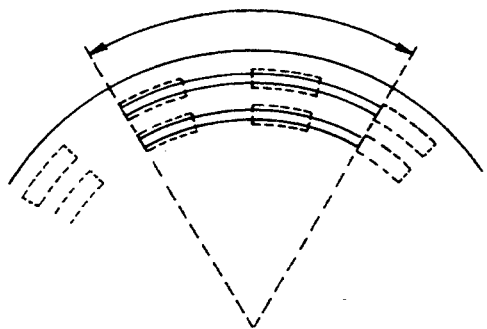

FIG. 8A shows an example where the fixed collimator plate apertures cover exactly one aperture pitch of the apertures of the input and output masks. FIG. 8B shows the case where the fixed collimator plate apertures cover exactly two aperture pitches of the input and output masks. In the specific embodiment of FIG. 1 the collimator apertures 40a and 40b extend for two aperture pitches of the mask apertures, as in FIG. 8B.

The provision of a torsion bar between the input and output shafts makes it easier to monitor relative twisting between the shafts. A full-scale output of the detector assembly is give by an angular twist of ± (¼ mask aperture pitch). To obtain the best signal/noise ratio it is desirable to use as much of this range as possible. Of course, we could allow the shafts to twist by more that ±¼ (mask aperture pitch), but this would require further processing or monitoring of the output signal to account for the fact that as the ¼ pitch position is passed the strength of the signals from the inner and outer detectors would begin to increase/decrease-there would no longer be 1:1 correspondence between the control function:

$$\text{Torque Signal} = K \frac{S_o - S_I}{S_o + S_I}$$

In the power-assisted steering system 1 of FIG. 1 the relative torque, or relative angular displacement, sensor 18 is used to produce signals to control the electric steering motor 9, as described. However, when the vehicle to which the power-assisted steering system is fitted also has sophisticated active suspension, or a microprocessor controlled braking system, the sensor 18 can provided useful information for use in the active suspension or braking systems. The sensor 18 produces a signal indicative of the relative angular displacement between the input and output shafts of the steering system. By knowing the zero, straight ahead, position of the steering wheel (and the steerable road wheels) and monitoring the relative angular displacement between the input and output shafts a microprocessor can obtain a value for the steering angle of the wheels. Similarly the rate of change of steering angle, or rate of change of torque, can be monitored. Both of these variables can be used in an active suspension control, or a braking control, algorithm.

We may use annular light sources and/or annular light detectors, if they can be produced economically. This would give total uniformity of illumination and circular symmetry.

In a modification of the detector assemblies we prefer to use a light detector in conjunction with a collimator aperture and readily available low cost photodetectors. However, such low cost photodetectors usually have an aperture which is too small to cover the desired size of the fixed apertures in the collimator plate. In this case, two or more detectors are used for each ring of rotating mask apertures, each detector being fitted with a stationary collimator plate and aperture. The total area of all the collimator apertures is arranged to be equivalent to that which would be used with a single, large area detector.

The detectors do not have to be adjacent in a circumferential direction, but can be displaced by an amount depending on the aperture pitch. For example, consider the situation in FIG. 9. An optical detector 90 is designed to have an angular range of ±7.5° for full scale. This means that the aperture pitch is 30°. There are two detectors for each of the inner and outer rings of apertures. Each detector covers 15° of the total 30°, since the total detector aperture is an integer multiple of the aperture pitch. The outputs of the two detectors are electrically summed. Each detector is fitted with a fixed aperture to limit its field of view to a 15° sector. Since there is often insufficient space to mount the detectors to view adjacent 15° sectors, advantage is taken of the repetitive nature of the mask discs and the detectors are situated 30° apart so that the total effect is that of a single detector with a 30° aperture.

For such a system, the light source can either be separate devices such as LED's fitted with 15° apertures, or alternatively as shown in FIG. 10, a device such as an LED light bar 100 which contains several LED's and a diffuser in one package. If this is sufficiently large to overlap all the required fixed mask locations it can be fitted with a mask containing the required pattern of apertures. This has the advantage of greater uniformity of illumination and hence better performance.

Figure 11:
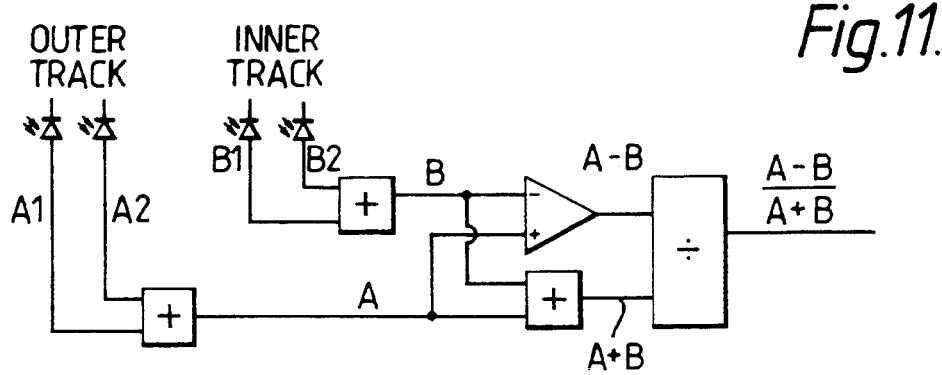
FIGS. 11 to 13 show circuit diagrams which can be used to process the signals from first and second detectors of the system.

An example of the kind of electronic system which can be used with the arrangement of FIGS. 9 and/or 10 is shown in FIG. 11. The signals from the two outer track detectors A1 and A2 are first summed to produce a total outer signal A. The same process is applied to the inner track detector signals B1 and B2 to produce a total inner signal B. An adding circuit then produces an A-B signal. A divider is then used to give an output proportional to (A−B)/(A+B), and hence the shaft torque.

As mentioned earlier, the torque sensor can be used to obtain the rate of rotation of the shaft to be determined in addition to torque. Such information may be required as part of, for example, an active vehicle suspension system. Using the torque sensor as part of a power assisted steering system, the steering rate signal for the suspension system could be generated at very little additional cost.

Figure 12:
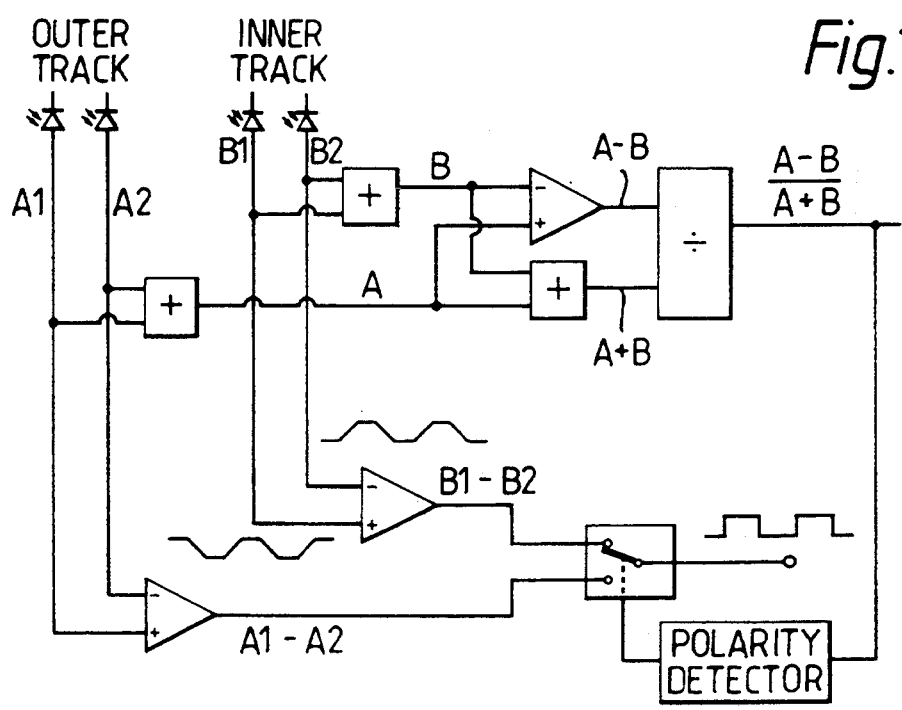

With a detector as described with reference to FIG. 9 with two small area detectors 90 per channel, the detector outputs may for example be connected as in FIG. 12. The signals from the two outer track detectors A1 and A2 are connected to the inputs of a comparator. Since A1 and A2 are complementary, the output from the comparator is a square wave with a frequency depending upon the shaft rotation speed.

Another comparator operates on the signals from the inner track detectors B1 and B2. By comparing the output of one detector with that of the other detector on that channel the change in detector output with torque or with light source intensity is compensated. However, at maximum torque one set of detectors will produce a very small output which may be too small for reliable operation of the comparator. For this reason two comparators are used, and the torque direction signal is used to determine which comparator will be used to provide the speed information, since at least one of the comparators will always be working with large signals (which is preferable).

Figure 13:
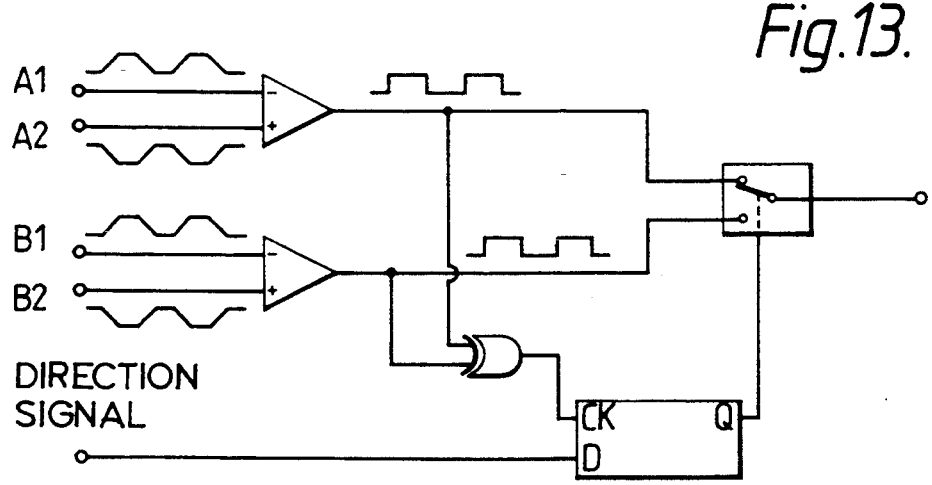

It may be necessary to use a suitable circuit to prevent spurious pulses being generated at a direction change. An example is shown in FIG. 13. The outputs of the two comparators are fed to an exclusive or-gate. Only when the two comparators give the same output will the D-type latch be enabled and the direction signal passed through to the switch, thus the switch can change state without giving any spurious transitions at its output. At the extremes of the torque range, when one comparator is giving an unreliable output, the direction signal will not be changing, so the switch will not change state even if the D-type latch is enabled by spurious pulses.

Of course, software may perform the functions of the hardware circuits described.

It will also be appreciated that although we have referred to light sources and emitters, any rectilinear source (such as a radioactive source) could be used. Furthermore, although the angular displacement sensor is primarily intended to indicate relative torque between an input shaft and an output shaft of a power-assisted steering system it could be used solely for the other variables which it can indicate (after appropriate treatment of its signals), for example as a steering angle sensor or a rate of change of torque, or steering angle, sensor.

In practice we may choose to have the various apertures in the collimators and/or movable masks elongate, (for example apertures 39,40,39,40',40a,40b) in a radial direction, instead of a circumferential direction. We may not have the apertures significantly elongate in any direction.

In another possible embodiment an emitter of an emitter-receiver pair is provided associated with the input member (and the complementary receiver associated with the output member), and an emitter of a second emitter-receiver pair is provided associated with the output member (and the receiver associated with the input member).

In a further embodiment the emitter and/or receivers are angularly moveable with a respective one of the input or output members, which may eliminate the need for the mask 26 or 24, or both.

I claim:

1. A torque sensor comprising:
   an input member;
   an output member;
   emitter means;
   first receiver means for receiving a first signal, said first receiver means comprising means to output a first output signal dependent upon the first signal;
   second receiver means for receiving a second signal, said second receiver means comprising means to output a second output signal dependent upon the second signal; and
   signal processing means for dividing the difference between the first and second output signals by the sum of the first and second output signals so as to produce a modified output signal which is directly proportional to relative angular displacement between, or torque applied between, said input and output members.

2. A torque sensor according to claim 1, further comprising signal varying means, said signal varying means being interposed between said emitter means and at least one of said receiver means.

3. A torque sensor according to claim 2 wherein said signal varying means is angularly moveable with a one of said input and output members.

4. A torque sensor according to claim 3 wherein said signal varying means comprises a component angularly moveable with said input member and a component angularly moveable with said output member.

5. A torque sensor according to claim 1 wherein there is a first effective emitter associated with one of said input and output members, a first effective receiver associated with the other of said input and output members, a second effective emitter associated with a first of said input and output members, a second effective receiver associated with a second of said input and output members, and signal processing means, said effective receivers each being adapted to produce an output signal indicative of the signal which it itself receives from its respective complementary effective emitter.

6. A torque sensor according to claim 5 wherein said one of said input and output members is said first of said input and output members.

7. A torque sensor according to claim 5 wherein said first and second effective emitters comprise the same effective emitter.

8. A torque sensor according to claim 1, wherein there is a single emitter.

9. A torque sensor according to claim 1, wherein the sum of the first and second output signals is substantially constant, irrespective of the torque applied.

10. A torque sensor according to claim 1, further comprising an input mask and an output mask, wherein input and output masks are associated with said input and output members respectively, and each mask has one or more apertures which are partially overlapped, or superimposed, in such a manner that when said input and output members move angularly relative to each other in one sense the overlap increases allowing more signal through, but when they move relative to each other in the opposite angular sense the degree of overlap decreases, reducing the amount of signal let through.

11. A torque sensor according to claim 10 wherein at least one of said masks comprises an outer arc of angularly spaced apertures and a radially spaced inner arc of angularly spaced apertures.

12. A power-assisted steering system having a torque sensor comprising:
   an input member;
   an output member;
   emitter means;
   first receiver means for receiving a first signal, said first receiver means comprising means to output a first output signal dependent upon the first signal;
   second receiver means for receiving a second signal, said second receiver means comprising means to output a second output signal dependent upon the second signal;

signal processing means for dividing the difference between the first and second output signals by the sum of the first and second output signals so as to produce a modified output signal which is directly proportional to relative angular displacement between, or torque applied between, said input and output members;

an input column transmitting torque from steering wheel to said input member of said torque sensor; and an output column transferring torque to a steering mechanism adapted to steer road wheels of the system.

13. A vehicle which incorporates a power-assisted steering system according to claim 12 and wherein information from the torque sensor is used to determine at least one of (a) the torque applied to the input member; (b) the rate of turning of the vehicle's steering wheel; or (c) the angular displacement of the vehicle's steering wheel.

14. A vehicle according to claim 13 wherein the information corresponding to one or more of (a), (b) and (c) is used in a vehicle control microprocessor to modify or control the suspension characteristics of said vehicle.

15. A vehicle according to claim 13 wherein the information corresponding to one or more of (a), (b) and (c) is used in a vehicle control microprocessor to modify or control the braking characteristics of said vehicle.

16. A vehicle according to claim 15 wherein said information is also used in the vehicle control microprocessor to modify or control the suspension characteristics of said vehicle.

* * * * *